United States Patent
Yamazaki et al.

(10) Patent No.: US 9,592,817 B2
(45) Date of Patent: Mar. 14, 2017

(54) ENERGY MANAGEMENT CONTROL SYSTEM

(75) Inventors: Mark Steven Yamazaki, Canton, MI (US); Fazal Urrahman Syed, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 833 days.

(21) Appl. No.: 13/346,976

(22) Filed: Jan. 10, 2012

(65) Prior Publication Data

US 2013/0179014 A1    Jul. 11, 2013

(51) Int. Cl.

| B60W 10/00 | (2006.01) |
| B60W 20/00 | (2016.01) |
| B60W 10/06 | (2006.01) |
| B60W 10/08 | (2006.01) |
| B60W 10/26 | (2006.01) |

(52) U.S. Cl.
CPC ............ *B60W 10/06* (2013.01); *B60W 10/08* (2013.01); *B60W 10/26* (2013.01); *B60W 20/13* (2016.01); *B60W 2540/10* (2013.01); *B60W 2710/0677* (2013.01); *B60W 2710/086* (2013.01); *B60W 2710/105* (2013.01); *B60W 2710/242* (2013.01); *Y02T 10/6286* (2013.01)

(58) Field of Classification Search
CPC ...... B60W 10/06; B60W 10/08; B60W 10/26; B60W 20/00; F04C 13/05
USPC ......................................................... 701/22
See application file for complete search history.

(56) References Cited

U.S. PATENT DOCUMENTS

| 6,441,506 | B2 * | 8/2002 | Nakashima ................. 290/40 C |
| 6,687,582 | B1 * | 2/2004 | De La Salle et al. .......... 701/22 |
| 7,237,634 | B2 * | 7/2007 | Severinsky et al. ....... 180/65.23 |
| 7,275,610 | B2 | 10/2007 | Kuang et al. |
| 7,335,131 | B2 * | 2/2008 | Smithberger et al. ............ 477/3 |
| 7,680,567 | B2 | 3/2010 | Syed et al. |
| 7,749,132 | B2 * | 7/2010 | Motosugi et al. ................ 477/5 |
| 7,794,356 | B2 * | 9/2010 | Muta et al. ....................... 477/3 |
| 7,832,511 | B2 | 11/2010 | Syed et al. |

(Continued)

FOREIGN PATENT DOCUMENTS

| CN | 101638092 A | 2/2010 |
| CN | 101648563 A | 2/2010 |
| CN | 101712274 A | 5/2010 |

OTHER PUBLICATIONS

Mashadi, B., et al, "Dual-Mode Power-Split Transmission for Hybrid Electric Vehicles," IEEE Trans. Vehicular Technology, vol. 59, No. 7 Sep. 2010, pp. 3223-3232.*

(Continued)

*Primary Examiner* — Fadey Jabr
*Assistant Examiner* — Kevin P Mahne
(74) *Attorney, Agent, or Firm* — David Kelley; Brooks Kushman P.C.

(57) ABSTRACT

A system and method for controlling energy distribution within a HEV powertrain are provided. A feedforward battery power value is generated in response to input indicative of a driver torque request. A feedback battery power modification value is generated in response to input indicative of actual battery power and the driver torque request. A battery power request is calculated based a sum of the feedforward battery power value and the feedback battery power modification value.

18 Claims, 5 Drawing Sheets

(56) References Cited

U.S. PATENT DOCUMENTS

| | | | |
|---|---|---|---|
| 8,010,247 B2 * | 8/2011 | Heap et al. | 701/22 |
| 8,080,971 B2 * | 12/2011 | Bose et al. | 320/101 |
| 8,315,755 B2 * | 11/2012 | Hirata et al. | 701/22 |
| 8,437,933 B2 * | 5/2013 | Akebono et al. | 701/68 |
| 2007/0135976 A1 * | 6/2007 | Park | 701/22 |
| 2007/0276557 A1 * | 11/2007 | Motosugi et al. | 701/22 |
| 2008/0190680 A1 * | 8/2008 | Kaneko et al. | 180/170 |
| 2009/0210108 A1 * | 8/2009 | Okubo et al. | 701/22 |
| 2010/0305795 A1 | 12/2010 | Kuang et al. | |
| 2011/0118078 A1 | 5/2011 | Kraska et al. | |
| 2011/0245034 A1 * | 10/2011 | Yoshida et al. | 477/8 |
| 2012/0065016 A1 * | 3/2012 | Tamai et al. | 475/5 |
| 2012/0078456 A1 * | 3/2012 | Hakumura et al. | 701/22 |
| 2012/0083953 A1 * | 4/2012 | Izawa et al. | 701/22 |
| 2013/0005529 A1 * | 1/2013 | Chen et al. | 477/4 |

OTHER PUBLICATIONS

Joshi, A.S., et al, "Modeling and Simulation of a Dual Clutch Hybrid Vehicle Powertrain," Vehicle Power and Propulsion Conference, 2009, Sep. 7-10, 2010 (IEEE), pp. 1666-1673.*

Chinese Patent Office, Office Action dated Mar. 26, 2016 for CN201310009551.X.

* cited by examiner

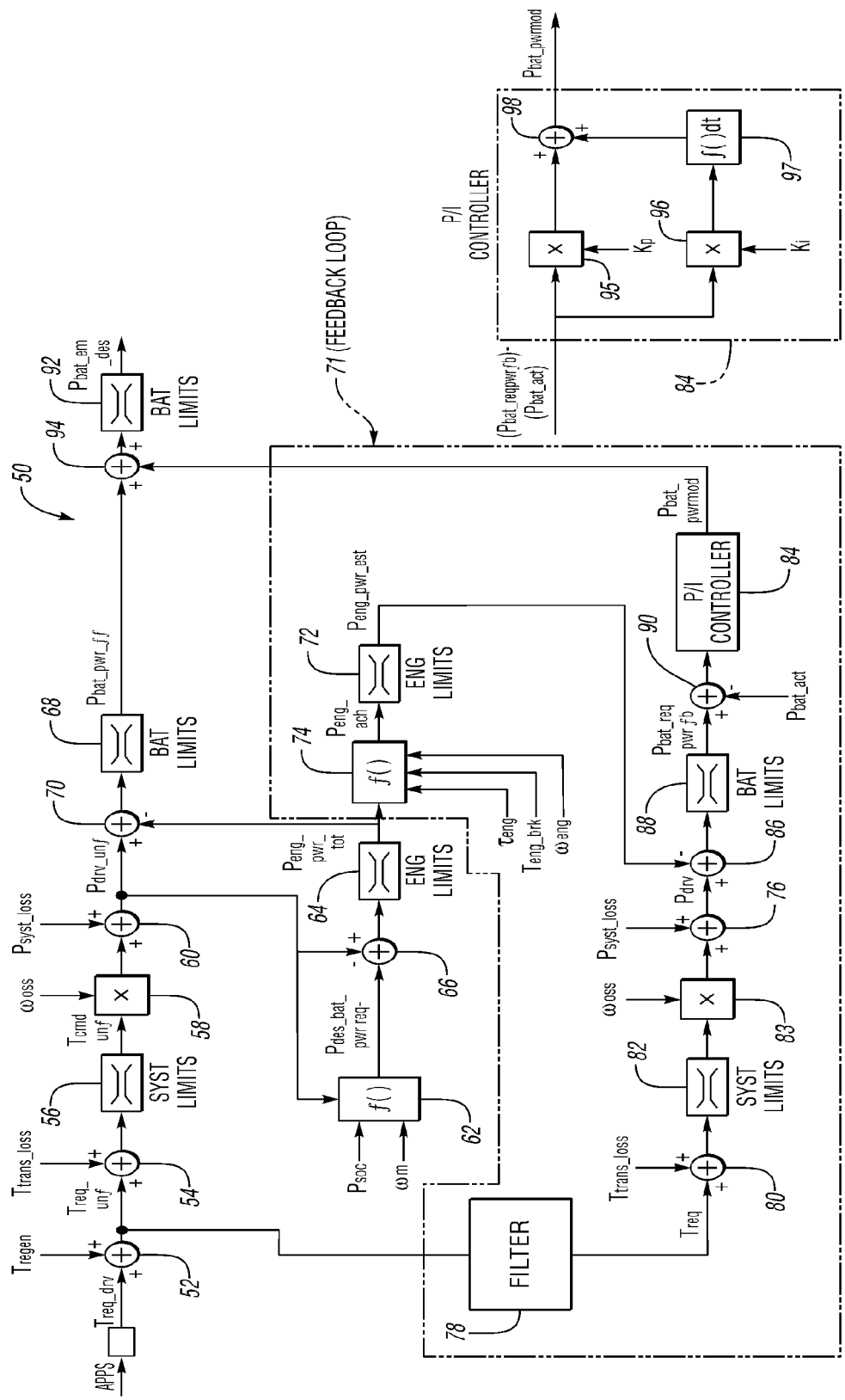

ENERGY MANAGEMENT CONTROL SYSTEM

TECHNICAL FIELD

One or more embodiments relate to a control system for controlling distribution of energy from a battery in a powertrain for a hybrid electric vehicle.

BACKGROUND

Hybrid electric vehicles (HEV's) utilize a combination of an internal combustion engine with an electric motor to provide the power needed to propel a vehicle. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or if the battery state of charge (SOC) drops below a certain level, the engine starts quickly and smoothly in a manner that is nearly transparent to the driver. Another method of improving the fuel economy in an HEV is to only operate the engine in a high efficiency range, and control the motor to add power, or subtract power from the overall power needed to meet the power demand.

A modular hybrid powertrain (MHT) is a powertrain that includes components from a conventional vehicle (e.g., the engine, transmission gear box and differential) and integrates hybrid components (e.g., motor, high voltage battery, clutches) to provide a HEV.

SUMMARY

In one embodiment, a method for controlling energy distribution within a HEV powertrain is provided. A feedforward battery power value is generated in response to input indicative of a driver torque request. A feedback battery power modification value is generated in response to input indicative of actual battery power and the driver torque request. A battery power request is calculated based a sum of the feedforward battery power value and the feedback battery power modification value.

In another embodiment, a control system is provided with a controller. The controller generates a driver power request based on a system limited sum of a driver torque request and a transmission torque loss value. The controller also generates a feedforward battery power value as a function of the driver power request, and an engine power request. The controller then calculates a battery power request in response to the feedforward battery power value.

In yet another embodiment, a hybrid electric vehicle is provided with a control unit configured to generate output indicative of a gear selection in response to a transmission input speed. A controller communicates with the control unit and is configured to generate output indicative of an engine torque command and a motor torque command in response to input indicative of a driver torque request and actual battery power, and independent of the gear selection.

As such, various embodiments provide one or more advantages. Hybrid electric vehicles (HEV's) utilize a combination of an internal combustion engine with an electric motor to provide the power needed to propel a vehicle. This arrangement provides improved fuel economy over a vehicle that has only an internal combustion engine. Further, the vehicle includes a modular hybrid transmission (MHT) with an energy management control system. The control system simplifies the control logic of the vehicle by separating speed and torque determinations into two independent control variables (gear selection and battery power request).

BRIEF DESCRIPTION OF THE DRAWINGS

FIG. 3 is a schematic block diagram of an energy management control system;

FIG. 4 is an enlarged view of a portion of the control system of FIG. 3;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
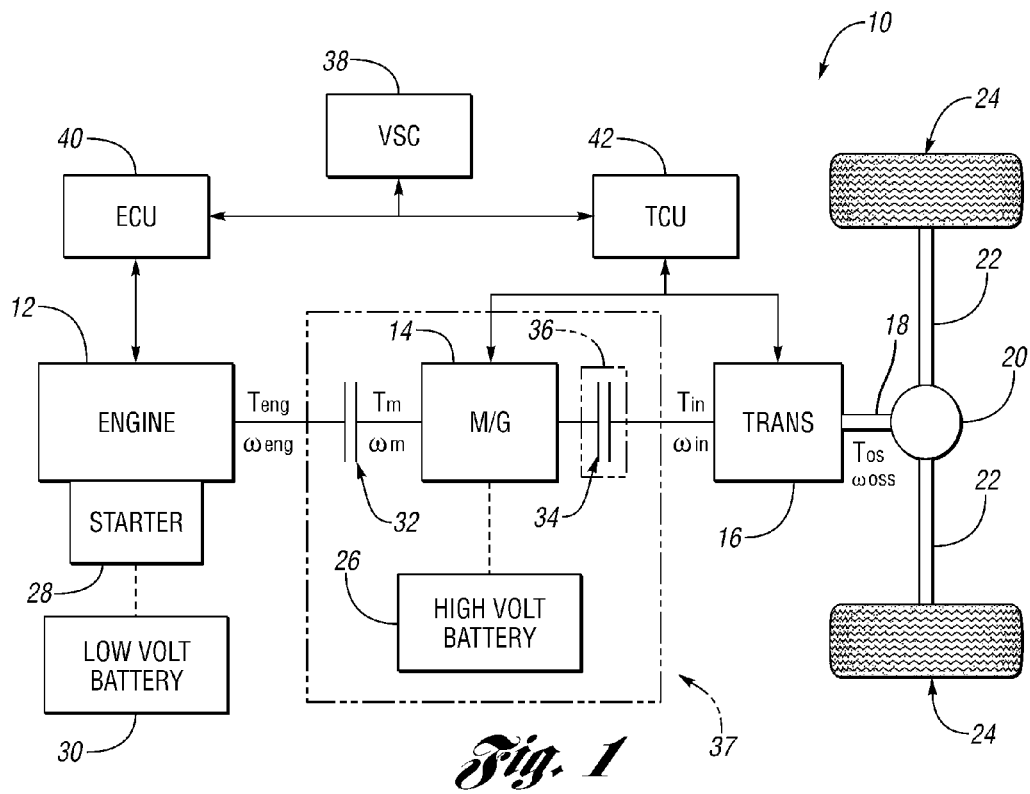
FIG. 1 is a schematic diagram of a hybrid electric vehicle according to one or more embodiments.

With reference to FIG. 1, a vehicle is illustrated in accordance with one or more embodiments and is generally referenced by numeral 10. Generally, the vehicle 10 includes an energy management control system that provides advantages over existing control systems by simplifying the control. As described below with respect to FIG. 2, this simplification includes separating speed and torque determinations into two independent control variables (gear selection and battery power request). Further, the determination of the battery power request may be further simplified by disabling a feedback loop within the control under certain operating conditions, as described below with respect to FIGS. 3-5C.

The vehicle 10 is an HEV, and includes an engine 12, an electric machine, or motor/generator (M/G) 14, and a transmission 16. An output shaft 18 extends from the transmission 16 and connects to a differential 20. A pair of half shafts 22 extend from the differential 20; and each shaft 22 connects to a drive wheel 24.

The M/G 14 operates as a motor and a generator. The M/G 14 operates as a motor by receiving electrical power from a high voltage battery 26 and providing torque ($T_{in}$) to the transmission 16 for propelling the vehicle 10. The M/G 14 operates as a generator by receiving engine torque ($T_{eng}$) and/or torque from the transmission 16, thereby charging the high voltage battery 26.

The vehicle 10 includes a starter 28 for starting the engine 12. The starter 28 receives electrical power from a low voltage battery 30 and provides torque to the engine 12 for cranking the engine 12. In one or more embodiments, the M/G 14 operates as a starter and receives electrical power from the high voltage battery 26 and provides torque for cranking the engine 12.

The vehicle 10 includes clutches for selectively disconnecting the M/G 14 and/or the engine 12 from the drive wheels 24. A disconnect clutch 32 is disposed between the engine 12 and the M/G 14. The disconnect clutch 32 is operated to engage or disengage the engine 12 from the rest of the powertrain. By disengaging the engine 12, the vehicle 10 may be propelled by the M/G 14 in an electric mode. A launch clutch 34 is disposed between the M/G 14 and the transmission 16, according to one or more embodiments. The launch clutch 34 is operated to engage or disengage the M/G 14 (and engine 12) from the transmission 16. The launch clutch 34 may also be controlled to partially engage with the transmission 16. This partial engagement, or "slip", limits any oscillations within the powertrain from being transferred to the drive wheels 24. Both the disconnect clutch 32 and the launch clutch 34 are configured as hydraulic clutches according to at least one embodiment. Other embodiments of the vehicle 10 include mechanical or electrical clutches.

Alternate embodiments of the vehicle 10 include a torque converter 36 rather than a launch clutch 34 disposed between the M/G 14 and transmission 16. A torque converter 36 is typically less efficient than a launch clutch 34. However, the launch clutch 34 typically requires a more sophisticated control strategy. Therefore the vehicle 10 may include a launch clutch 34 or a torque converter 36 based on application preferences.

The vehicle 10 includes a modular hybrid transmission (MHT). A MHT is a powertrain that includes components from a conventional vehicle (e.g., the engine, transmission gear box and differential) and integrates hybrid components (e.g., motor, high voltage battery, clutches) to provide a HEV. The hybrid components are generally referenced by numeral 37 in FIG. 1. By utilizing many conventional or "carry over" components, the vehicle 10 may benefit from "economies of scale", which reduces the overall cost and complexity of the vehicle 10.

The vehicle 10 includes a vehicle system control (VSC) for controlling various vehicle systems and subsystems and is generally represented by block 38 in FIG. 1. The VSC 38 includes a plurality of interrelated algorithms which are distributed amongst a plurality of controllers within the vehicle 10. For example, the algorithms for controlling the MHT powertrain are distributed between an engine control unit (ECU) 40 and a transmission control unit (TCU) 42. The ECU 40 is electrically connected to the engine 12 for controlling the operation of the engine 12. The TCU 42 is electrically connected to the M/G 14 and the transmission 16 for controlling their operation. The ECU 40 and TCU 42 communicate with each other and other controllers (not shown) over a hardline vehicle connection using a common bus protocol (e.g., CAN), according to one or more embodiments. Although the illustrated embodiment depicts the VSC 38 functionality for controlling the MHT powertrain as being contained within two controllers (ECU 40 and TCU 42) other embodiments of the HEV 10 include a single VSC controller or more than two controllers for controlling the MHT powertrain.

The VSC 38 algorithms for controlling the MHT powertrain are simplified into two "degrees of freedom": speed and torque. The TCU 42 determines a first independent control variable (gear selection) which corresponds to speed. The ECU 40 determines a second independent control variable (battery power request), which corresponds to torque.

Figure 2:
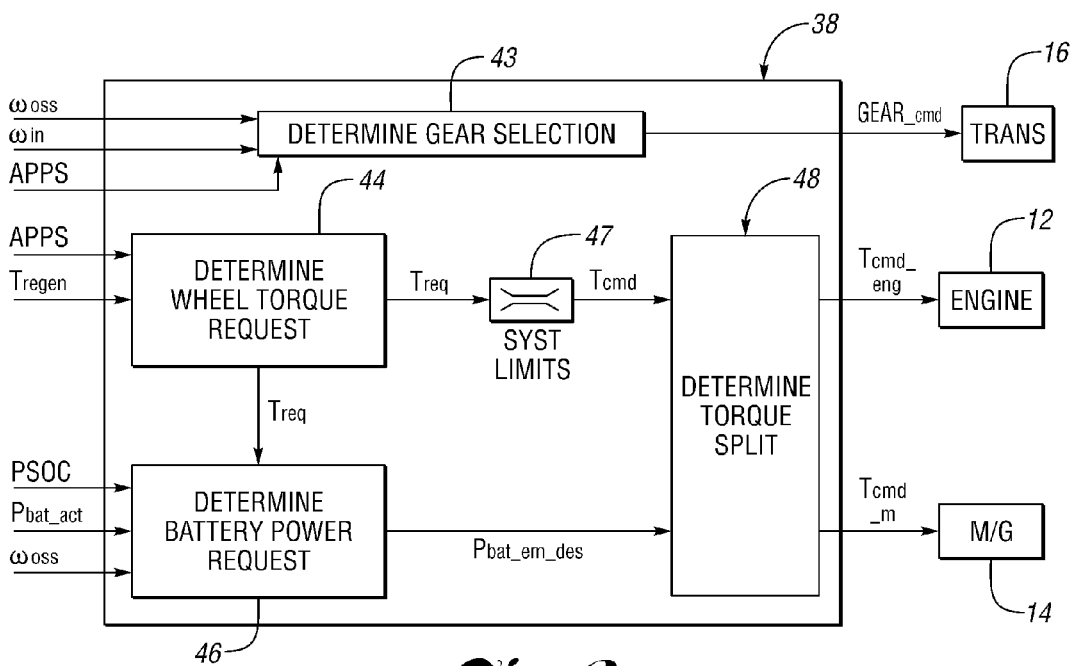
FIG. 2 is an enlarged schematic view of a portion of the hybrid electric vehicle of FIG. 1.

FIG. 2 depicts a simplified block diagram of the VSC 38 algorithms for determining the two independent control variables: gear selection, and battery power request. With reference to FIGS. 1 and 2, the VSC 38 algorithms are contained within the ECU 40 and TCU 42 according to one or more embodiments.

With reference to FIGS. 1 and 2, the VSC 38 determines the first independent control variable (gear selection) at block 43. The VSC 38 receives input ($\omega_{oss}$) and ($\omega_{in}$), that represent the output shaft speed and the transmission input speed, respectively. The VSC 38 also receives an input accelerator pedal position signal (APPS), which represents a driver request for wheel torque. The input may be received directly as an input signal from individual systems or sensors (not shown), or indirectly as input data over the CAN bus. For example, the output shaft speed ($\omega_{oss}$) and the transmission input speed ($\omega_{in}$), may be received as input signals from speed sensors (not shown). The VSC 38 determines the gear selection at block 43 in response to the input ($\omega_{oss}$), ($\omega_{in}$) and (APPS), and provides output (GEAR_cmd) to the transmission 16 that represents a gear selection command.

The gear selection (e.g., first, second, third, etc.) defines the gear ratio of the transmission 16. Since the vehicle includes an inline engine 12 and M/G 14, and a transmission 16 having discrete gear ratios ("step-ratio"); speed calculations throughout the powertrain are simplified, as compared to prior art HEVs having continuously variable transmissions that provide infinite gear ratios. For example, when the disconnect clutch 32 is engaged, the speed of the M/G 14 corresponds to the engine speed ($\omega_{eng}$). The engine speed ($\omega_{eng}$) and the speed of the M/G 14 are equal to each other when the disconnect clutch 32 is fully engaged (no slip). The output shaft speed ($\omega_{oss}$) corresponds to the M/G 14 speed and the gear ratio of the transmission 16. The speed of each drive wheel 24 corresponds to the output shaft speed ($\omega_{oss}$) and the gear ratio of the differential 20. Wheel speed may also be correlated to the vehicle speed (mph).

The VSC 38 determines a wheel torque request at block 44. The VSC 38 receives input ($T_{regen}$) and (APPS) that represent a regenerative braking torque and the driver request for wheel torque, respectively. The input may be received directly as an input signal from individual systems or sensors (not shown), or indirectly as input data over the CAN bus. For example, the regenerative braking torque ($T_{regen}$) may be received as an input signal from a brake system controller (not shown). The accelerator pedal position (APPS) may be received as an input signal from an accelerator pedal position sensor (not shown). The VSC 38 determines a wheel torque request at block 44 in response to input ($T_{regen}$), (APPS), and ($\omega_{oss}$), and provides output ($T_{req}$) that represents a driver torque request.

The VSC 38 determines a battery power request at block 46. The VSC receives input (PSOC), ($P_{bat\_act}$) and ($\omega_{oss}$) that represent the power state of charge maintenance, the actual battery power, and the output shaft speed respectively. The input may be received directly as an input signal from individual systems or sensors (not shown), or indirectly as input data over the CAN bus. For example, the power state of charge maintenance (PSOC), the actual battery power ($P_{bat\_act}$), and the output shaft speed ($\omega_{oss}$) may be received as input signals from a battery controller (not shown). The VSC 38 also receives the driver torque request ($T_{req}$) at block 46. The VSC 38 determines the battery power request at block 46, in response to the input (PSOC), ($P_{bat\_act}$) and ($\omega_{oss}$), and the torque request ($T_{req}$); and provides output ($P_{bat\_em\_des}$) that represents a final HV battery power request.

The VSC 38 compares the driver torque request ($T_{req}$) to system limits at block 47 to determine a torque command ($T_{cmd}$). The system limits represent the predetermined operating limits of the engine, motor and battery. The torque split between the engine 12 and the M/G 14 is determined at block 48. The VSC 38 compares the torque command ($T_{cmd}$) to the final HV battery power request ($P_{bat\_em\_des}$), along with the predetermined data for the engine, to determine the torque contribution (split) required from the engine 12 and the M/G 14, and provides corresponding command signals ($T_{cmd\_eng}$) and ($T_{cmd\_m}$).

The gear selection control variable (gear selection) is determined by both HEVs and non-HEVs. The battery power request control variable ($P_{bat\_em\_des}$) is unique to HEVs. Since the gear selection control variable is determined independent of the battery power request variable, an HEV 10 and corresponding non-HEV provided with the VSC 38 would exhibit similar performance characteristics. For example, both the HEV and non-HEV would shift up in gear at approximately the same vehicle speed and/or transmission input speed ($\omega_{in}$). The independent control variables are determined in a manner to meet driver demand within the limits of the MHT powertrain and subsystems, and to achieve desired vehicle performance attributes (e.g., reduced fuel consumption, low emissions, drivability, extended battery life, etc.).

With reference to FIG. 3, a schematic block diagram illustrating operation of an energy management control system or method is illustrated in accordance with one or more embodiments and is generally referenced by numeral 50. The control system 50 corresponds to the determination blocks 44 and 46 of FIG. 2 for determining the battery power request ($P_{bat\_em\_des}$). The control system 50 is contained within the ECU 40 according to one or more embodiments, and may be implemented in hardware and/or software control logic as described in greater detail herein.

The control system 50 determines a driver torque request ($T_{req\_unf}$) at summing junction 52. The control system 50 receives input (APPS) and ($T_{regen}$) which represent the driver request for wheel torque and the regenerative braking torque respectively. The control system 50 adds the driver torque request derived from (APPS) to ($T_{regen}$) at summing junction 52 to calculate the driver torque request ($T_{req\_unf}$). The control system 50 accounts for efficiency losses within the transmission 16 by adding a transmission torque loss ($T_{trans\_loss}$) to the driver torque request ($T_{req\_unf}$) at summing junction 54.

A torque command ($T_{cmd\_unf}$) is determined at system comparator 56. The sum of the driver torque request ($T_{req\_unf}$) and transmission torque loss ($T_{trans\_loss}$) is compared to the system torque limits ($T_{sys\_max}$, $T_{sys\_min}$). The system torque limits are a function of engine torque limits ($T_{eng\_max}$, $T_{eng\_min}$), motor torque limits ($T_{m\_inst\_max}$, $T_{m\_inst\_min}$), battery limits ($P_{elec\_chg\_lim}$, $P_{elec\_dch\_lim}$), electrical efficiency ($P_{sys\_loss}$) and motor speed ($\omega_m$). The maximum system torque ($T_{sys\_max}$) is a function of ($T_{eng\_max}$, $T_{m\_inst\_max}$, $P_{elec\_dch\_lim}$, $P_{sys\_loss}$, $\omega_m$), and the minimum system torque ($T_{sys\_min}$) is a function of ($T_{eng\_min}$, $T_{m\_inst\_min}$, $P_{elec\_chg\_lim}$, $P_{sys\_loss}$, $\omega_m$), according to one or more embodiments.

The control system 50 evaluates the driver's request for vehicle propulsion in the torque domain, rather than the power domain, which allows for improved vehicle control. Prior art control systems for hybrid vehicles (not shown) often evaluate the driver's request in the power domain, which may lead to calculation errors when speed is zero. These prior art control systems that operate in the power domain, calculate torque by dividing power by speed, which could provide erroneous torque values of zero at start up, when speed is zero and torque is not zero. To compensate for this calculation, prior art power domain control systems often include substitute torque values for certain modes (e.g., motor start up).

The torque command ($T_{cmd\_unf}$) is converted into the power domain by multiplying ($T_{cmd\_unf}$) by the output shaft speed ($\omega_{oss}$) at multiplication junction 58. This product is added to the system power loss ($P_{sys\_loss}$) at summing junction 60 to determine the driver power request ($P_{drv\_unf}$). The system power loss ($P_{sys\_loss}$) represents efficiency losses within the M/G 14 and power electronics (not shown).

A desired high voltage battery power request ($P_{des\_bat\_pwrreq}$) is determined at block 62. The high voltage battery power request ($P_{des\_bat\_pwrreq}$) is determined based on optimizing system efficiency, and is a function of the driver power request ($P_{drv\_unf}$), power state of charge maintenance (PSOC), and motor speed ($\omega_m$). The power state of charge maintenance (PSOC) represents the electrical power available from both the battery and from the M/G 14 (when acting as a generator). The vehicle 10 includes a sensor (not shown) for providing an output signal ($\omega_m$) that represents the output speed of the M/G 14.

A total engine power request ($P_{eng\_pwr\_tot}$) is determined at engine comparator 64. The high voltage battery power request ($P_{des\_bat\_pwrreq}$) is subtracted from the driver power request ($P_{drv\_unf}$) at summing junction 66. This difference is then compared to the engine maximum and minimum power limits ($P_{eng\_max}$, $P_{eng\_min}$), at engine comparator block 64 to determine the total engine power request ($P_{eng\_pwr\_tot}$). Fuel economy of the HEV 10 is optimized by operating the engine 12 within a high efficiency range. The engine limits ($P_{eng\_max}$, $P_{eng\_min}$) correspond to this high efficiency range.

The control system 50 determines a system limited feed forward high voltage battery power ($P_{bat\_pwr\_ff}$) at battery comparator 68. The total engine power request ($P_{eng\_pwr\_tot}$) is subtracted from the driver power request ($P_{drv\_unf}$) at summing junction 70. This difference is then compared to the battery charge and discharge power limits ($P_{elec\_chg\_lim}$, $P_{elec\_dch\_lim}$) at battery comparator 68 to determine the system limited feed forward high voltage battery power value ($P_{bat\_pwr\_ff}$). The life of the HV battery 26 is extended by maintaining the battery SOC within a predetermined range. The battery limits ($P_{elec\_chg\_lim}$, $P_{elec\_dch\_lim}$) correspond to this range.

The control system 50 includes a feedback loop which is generally referenced by numeral 71 in FIG. 3. The feedback loop 71 provides a correction path for torque and power determinations. Under certain conditions, the control system 50 may bypass the feedback loop 71, as will be described below with reference to FIG. 4.

An engine power estimate ($P_{eng\_pwr\_est}$) is determined at engine comparator 72. Function block 74 receives the total engine power request ($P_{eng\_pwr\_tot}$) along with an engine time delay ($\tau_{eng}$), an engine brake torque value ($T_{eng\_brk}$), and an engine speed value ($\omega_{eng}$) and determines an achievable engine power value ($P_{eng\_ach}$). The engine time delay ($\tau_{eng}$) represents the time delay, or lag between when a torque command is provided to the engine, and when the engine output torque corresponds to the command. The engine brake torque ($T_{eng\_brk}$) represents the amount of engine torque being converted to electricity by the M/G 14 when acting as a generator to charge the battery. Engine speed ($\omega_{eng}$) represents the output speed of the engine 12. The achievable engine power ($P_{eng\_ach}$) is compared to the engine limits at the engine comparator 72, to determine the engine power estimate ($P_{eng\_pwr\_est}$).

The control system 50 determines a driver power estimate ($P_{drv}$) at summing junction 76. A weighted average filter 78 receives the driver torque request ($T_{req\_unf}$), and removes any rapid step changes in the signal to provide a filtered driver torque request ($T_{req}$). Next, the control system 50 accounts for efficiency losses within the transmission 16 by adding the transmission torque loss ($T_{trans\_loss}$) to the filtered driver torque request ($T_{req}$) at summing junction 80. The filtered driver torque request ($T_{req}$) is compared to the overall system limits at system comparator 82, and then converted into the power domain by being multiplied by the output shaft speed ($\omega_{oss}$) at multiplication junction 83. This product is added to the system power loss ($P_{sys\_loss}$) at summing junction 76 to determine the driver power estimate ($P_{drv}$).

The output of the feedback loop 71 is a feedback high voltage battery power modification value ($P_{bat\_pwrmod}$) which is determined by a proportional integral (PI) controller 84. The engine power estimate ($P_{eng\_pwr\_est}$) is subtracted from the driver power request ($P_{drv}$) at summing junction 86. This difference is compared to the battery limits at battery comparator 88, to determine a feedback high voltage battery power request ($P_{bat\_reqpwrfb}$). The voltage and current of the high voltage battery 26 are measured, and an actual battery power value ($P_{bat\_act}$) is calculated. The actual battery power ($P_{bat\_act}$) is subtracted from ($P_{bat\_reqpwrfb}$) at summing junction 90. The PI controller 84 receives this difference and determines the feedback high voltage battery power modification value ($P_{bat\_pwrmod}$).

The control system 50 determines the final high voltage battery power request ($P_{bat\_em\_des}$) at battery comparator 92. The system limited feed forward high voltage battery power value ($P_{bat\_pwr\_ff}$) and the feedback high voltage battery power modification value ($P_{bat\_pwrmod}$) are added together at summing junction 94. This sum is compared to the battery limits at the battery comparator 92 to determine the final high voltage battery power request value ($P_{bat\_em\_des}$).

FIG. 4 illustrates an enlarged view of the PI controller 84. The PI controller 84 receives the difference between the feedback high voltage battery power request ($P_{bat\_reqpwrfb}$) and the actual battery power ($P_{bat\_act}$) from summing junction 90. The PI controller 84 includes two parallel calculation paths. In the first path, the difference ($P_{bat\_reqpwrfb}-P_{bat\_act}$) is multiplied by a proportional constant (Kp) at multiplication junction 95. In the second path, the difference ($P_{bat\_reqpwrfb}-P_{bat\_act}$) is multiplied by an integral constant (Ki) at multiplication junction 96, and integrated at integration block 97. The PI controller 84 then adds the values from both paths at summing junction 98 to determine the feedback high voltage power modification value ($P_{bat\_pwrmod}$).

The calculations made by the PI controller 84 to determine the feedback high voltage battery power modification value ($P_{bat\_pwrmod}$) are summarized by equation 1 as shown below:

$$P_{bat\_pwrmod} = (P_{bat\_reqpwrfb} - P_{bat\_act})K_p + \int (P_{bat\_reqpwrfb} - P_{bat\_act})K_i dt$$

The feed forward path of the control system 50 is the main path, whereas the feedback loop 71 is optional and may be bypassed under certain operating conditions. Both constants (Kp) and (Ki) are calibratable, and may be set to zero by the ECU 40. As shown by equation 1 above, by setting constants (Kp) and (Ki) to zero, ($P_{bat\_pwrmod}$) would equal zero. The feedback loop 71 allows the control system 50 to correct any differences between desired and actual values. If the ECU 40 determines that such differences are negligible, then the ECU 40 may set the constants (Kp) and (Ki) to zero to further simplify the determination of the final high voltage battery power request ($P_{bat\_em\_des}$).

Figure 5A:
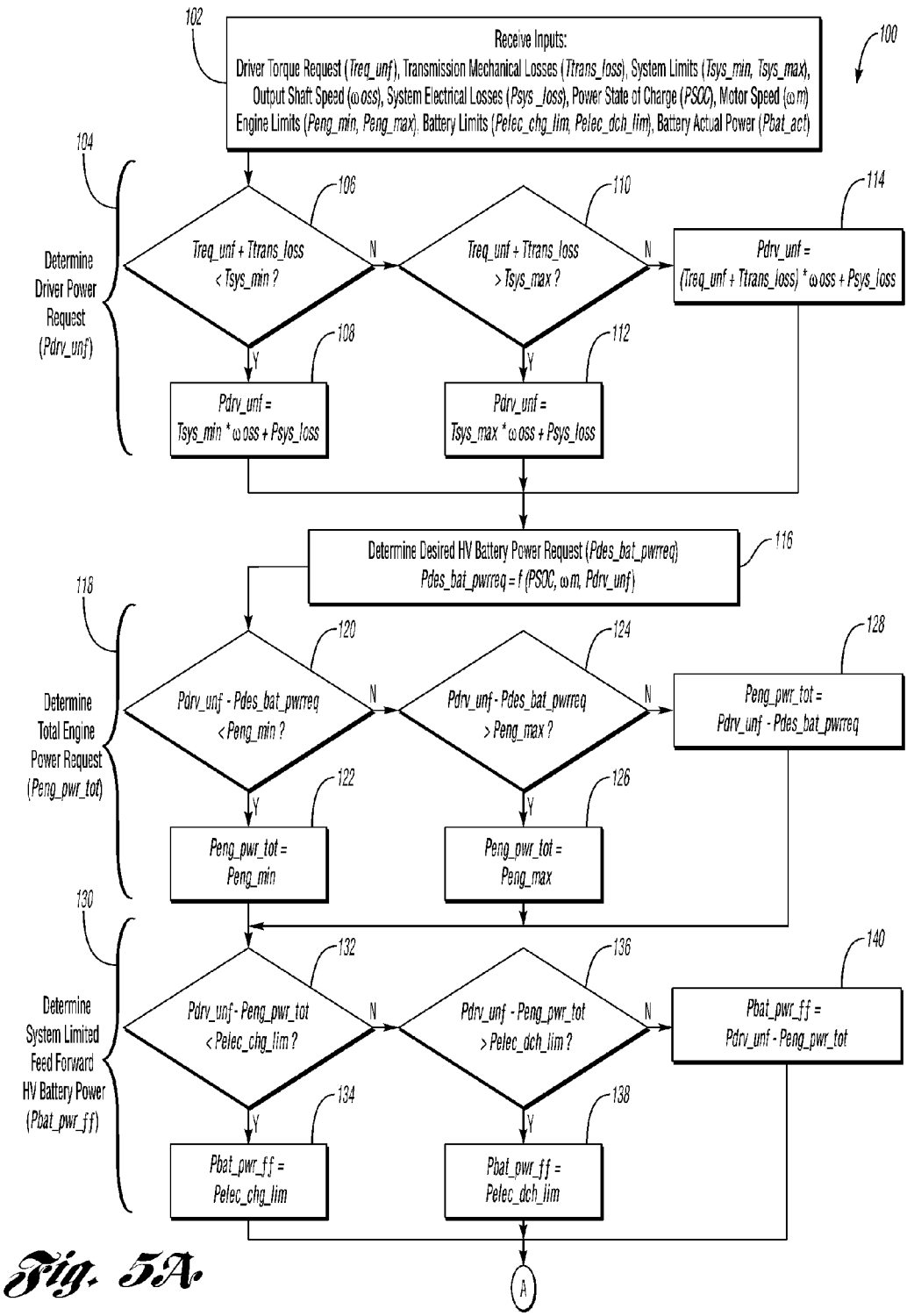
FIG. 5A is a portion of a flow chart illustrating a method for carrying out control functions shown in FIG. 3 for the hybrid electric vehicle of FIG. 1.
Figure 5B:
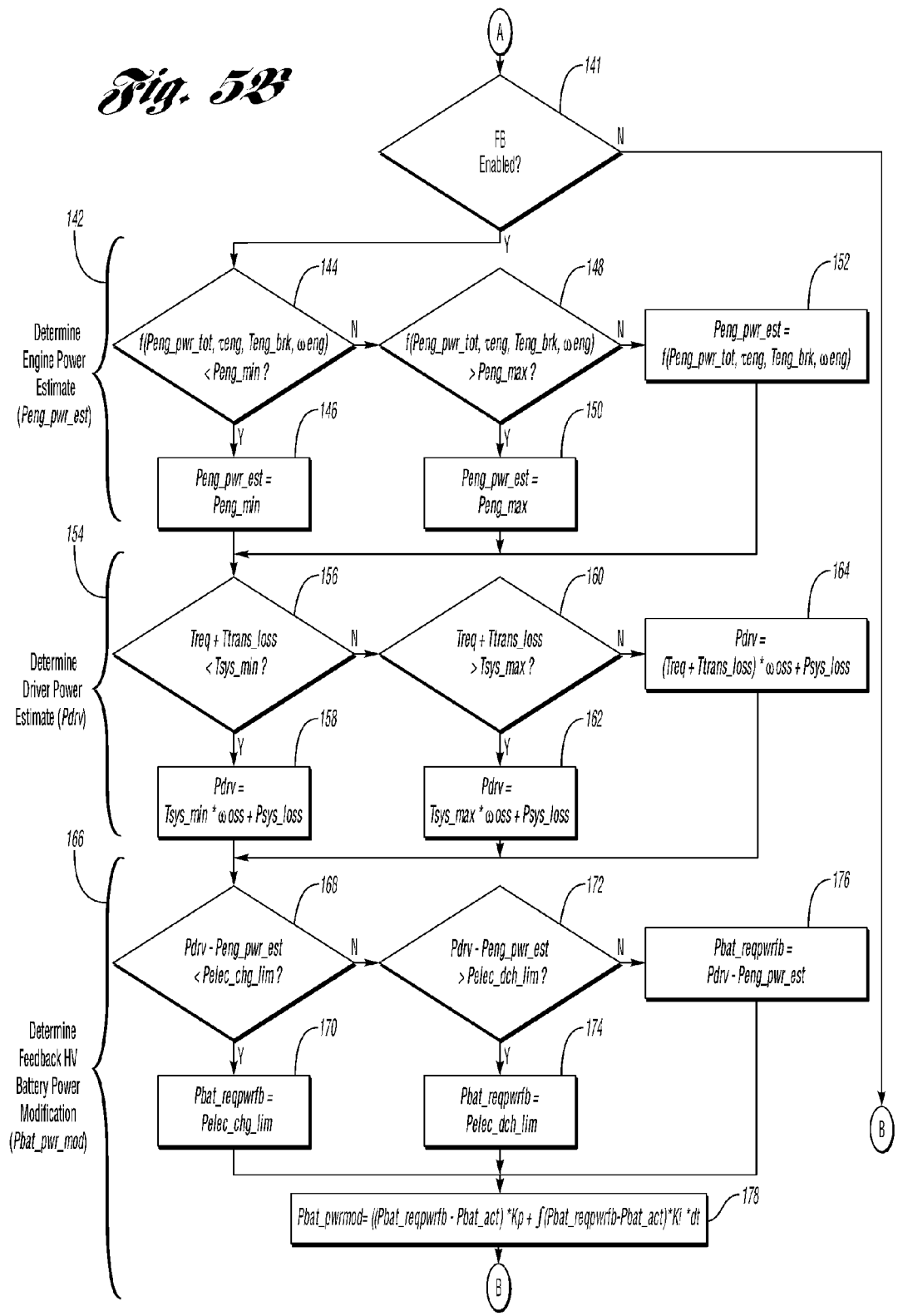
FIG. 5B is another portion of the flow chart of FIG. 5A.
Figure 5C:
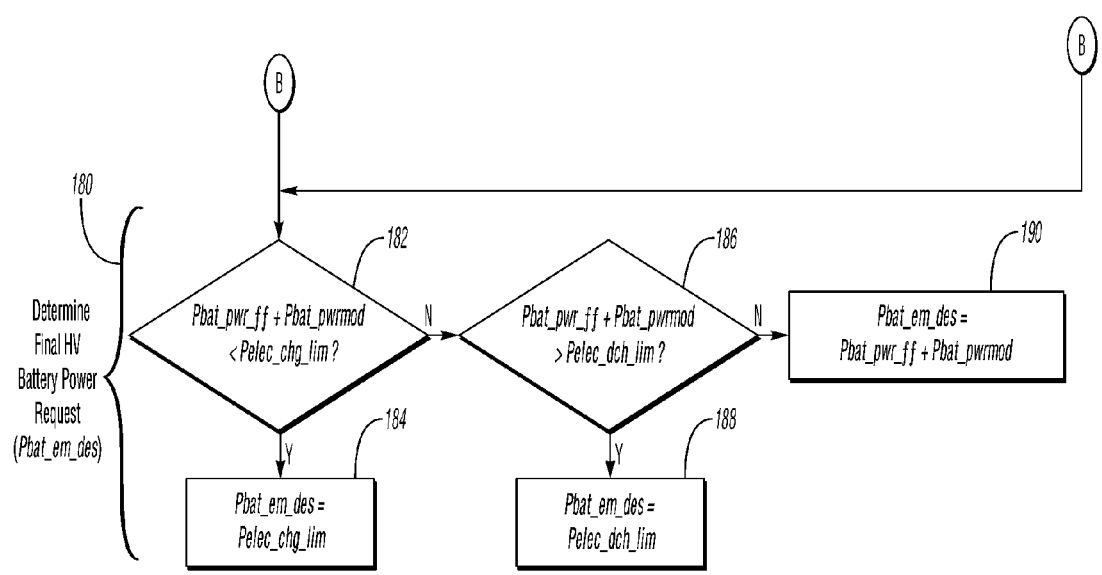
FIG. 5C is yet another portion of the flow chart of FIG. 5A.

FIGS. 5A-5C illustrate a method 100 for implementing the energy management control system 50 of FIGS. 2-4, according to one or more embodiments. The control system 50 is a portion of the overall VSC 38, and is performed by the ECU 40 of FIG. 1, according to one or more embodiments. The ECU 40 generally includes any number of microprocessors, ASICs, ICs, memory (e.g., FLASH, ROM, RAM, EPROM and/or EEPROM) which co-act with software code to perform the operations of the method 100. The method 100 includes eight determination blocks, where each block includes a series of operations to determine a variable or value.

In operation 102, the ECU 40 receives inputs from individual systems or sensors of the vehicle. The inputs include: the driver torque request ($T_{req\_unf}$), the transmission mechanical losses ($T_{trans\_loss}$), the system limits ($T_{sys\_min}$, $T_{sys\_max}$), the output shaft speed ($\omega_{oss}$), the system electrical losses ($P_{sys\_loss}$), the power state of charge maintenance (PSOC), the motor speed ($\omega_m$), the engine limits ($P_{eng\_min}$, $P_{eng\_max}$), the battery limits ($P_{elec\_chg\_lim}$, $P_{elec\_dch\_lim}$), and the battery actual power ($P_{bat\_act}$). After receiving the inputs, the control system 50 proceeds to block 104.

In block 104, the ECU 40 determines the driver power request ($P_{drv\_unf}$). The sum of the driver torque request ($T_{req\_unf}$) and the transmission mechanical losses ($T_{trans\_loss}$) is compared to the system limits ($T_{sys\_min}$, $T_{sys\_max}$). Then an equation for calculating the driver power request is selected based on the comparison.

In operation 106, the ECU 40 determines if the sum of the driver torque request ($T_{req\_unf}$) and the transmission mechanical losses ($T_{trans\_loss}$) is less than the minimum system torque ($T_{sys\_min}$). If the determination at operation 106 is positive, then the ECU 40 limits the torque to the minimum system torque ($T_{sys\_min}$) and calculates the driver power request ($P_{drv\_unf}$) at operation 108 according to equation 2 as shown below:

$$P_{drv\_unf} = (T_{sys\_min} * \omega_{oss}) + P_{sys\_loss} \qquad \text{Eq. 2}$$

If the determination at operation 106 is negative, then the ECU 40 proceeds to operation 110. In operation 110, the ECU 40 determines if the sum of the driver torque request ($T_{req\_unf}$) and the transmission mechanical losses ($T_{trans\_loss}$) is greater than the maximum system torque ($T_{sys\_max}$). If the determination at operation 110 is positive, then the ECU 40 limits the torque to the maximum system torque ($T_{sys\_max}$) and calculates the driver power request ($P_{drv\_unf}$) at operation 112 according to equation 3 as shown below:

$$P_{drv\_unf} = (T_{sys\_max} * \omega_{oss}) + P_{sys\_loss} \qquad \text{Eq. 3}$$

If the determination at operation 110 is negative, then the ECU 40 proceeds to operation 114. In operation 114, the ECU 40 calculates the driver power request ($P_{drv\_unf}$) according to equation 4 as shown below:

$$P_{drv\_unf} = ((T_{req\_unf} + T_{trans\_loss}) * \omega_{oss}) + P_{sys\_loss} \qquad \text{Eq. 4}$$

The ECU 40 proceeds to block 116, once it has determined the driver power request ($P_{drv\_unf}$) in block 104. In block 116, the ECU 40 determines the desired high voltage battery power request ($P_{des\_bat\_pwrreq}$) as a function of the driver power request ($P_{drv\_unf}$), the power state of charge maintenance (PSOC), and the motor speed ($\omega_m$). After block 116, the control system proceeds to block 118.

In block 118, the ECU 40 determines the total engine power request ($P_{eng\_pwr\_tot}$). First, the difference between the driver power request ($P_{drv\_unf}$) and the desired high voltage battery power request ($P_{des\_bat\_pwrreq}$) is compared to the engine limits ($P_{eng\_min}$, $P_{eng\_max}$). Then an equation for calculating the total engine power request ($P_{eng\_pwr\_tot}$) is selected based on the comparison.

In operation 120, the ECU 40 determines if the difference between the driver power request ($P_{drv\_unf}$) and the desired high voltage battery power request ($P_{des\_bat\_pwrreq}$) is less than the minimum engine power ($P_{eng\_min}$). If the determination at operation 120 is positive, then the ECU 40 limits the total engine power request to the minimum engine power ($P_{eng\_pwr\_tot}=P_{eng\_min}$) at operation 122. If the determination at operation 120 is negative, then the ECU 40 proceeds to operation 124. In operation 124, the ECU 40 determines if the difference between the driver power request ($P_{drv\_unf}$) and the desired high voltage battery power request ($P_{des\_bat\_pwrreq}$) is greater than the maximum engine power ($P_{eng\_max}$). If the determination at operation 124 is positive, then the ECU 40 limits the total engine power request to the maximum engine power ($P_{eng\_pwr\_tot}=P_{eng\_max}$) at operation 126.

If the determination at operation 124 is negative, then the ECU 40 proceeds to operation 128. In operation 128, the ECU 40 calculates the total engine power request ($P_{eng\_pwr\_tot}$) according to equation 5 as shown below:

$$P_{eng\_pwr\_tot}=P_{drv\_unf}-P_{des\_bat\_pwrreq} \quad \text{Eq. 5}$$

The ECU 40 proceeds to block 130, once it has determined the total engine power request in block 118. In block 130, the ECU 40 determines the system limited feed forward high voltage battery power value ($P_{bat\_pwr\_ff}$). The difference between the driver power request ($P_{drv\_unf}$) and the total engine power request ($P_{eng\_pwr\_tot}$) is compared to the battery limits ($P_{elec\_chg\_lim}$, $P_{elec\_dch\_lim}$). Then an equation for calculating the system limited feed forward high voltage battery power value ($P_{bat\_pwr\_ff}$) is selected based on the comparison.

In operation 132 the ECU 40 determines if the difference between the driver power request ($P_{drv\_unf}$) and the total engine power request ($P_{eng\_pwr\_tot}$) is less than the battery power charge limit ($P_{elec\_chg\_lim}$). If the determination at operation 132 is positive, then the ECU 40 limits the system limited feed forward high voltage battery power to the battery power charge limit ($P_{bat\_pwr\_ff}=P_{elec\_chg\_lim}$) at operation 134. If the determination at operation 132 is negative, then the ECU 40 proceeds to operation 136. In operation 136, the ECU 40 determines if the difference between the driver power request ($P_{drv\_unf}$) and the total engine power request ($P_{eng\_pwr\_tot}$) is greater than the battery power discharge limit ($P_{elec\_dch\_lim}$). If the determination at operation 136 is positive, then the ECU 40 limits the system limited feed forward high voltage battery power to the battery power discharge limit ($P_{bat\_pwr\_ff}=P_{elec\_dch\_lim}$) at operation 138.

If the determination at operation 136 is negative, then the ECU 40 proceeds to operation 140. In operation 140, the ECU 40 calculates the system limited feed forward high voltage battery power ($P_{bat\_pwr\_ff}$) according to equation 6 as shown below:

$$P_{bat\_pwr\_ff}=P_{drv\_unf}-P_{eng\_pwr\_tot} \quad \text{Eq. 6}$$

The ECU 40 proceeds to operation 141 once it has calculated the system limited feed forward high voltage battery power ($P_{bat\_pwr\_ff}$) in block 130. In operation 141, the ECU 40 determines if the feedback loop 71 (FIG. 3) is enabled. In one or more embodiments, this determination is made based on the calibrated values associated with the proportional constant (Kp) and the integral constant (Ki) of the PI controller 84 (as shown in FIG. 3). For example, if both constants (Kp and Ki) equal zero, then feedback is not enabled. However, if at least one of the constants does not equal zero, then feedback is enabled. If the determination at operation 141 is positive, then the ECU 40 proceeds to block 142.

In block 142 the ECU 40 determines the engine power estimate ($P_{eng\_pwr\_est}$). First the function $f(P_{eng\_pwr\_tot}, \tau_{eng}, T_{eng\_brk}, \omega_{eng})$ that was determined by function block 74 (FIG. 2), is compared to the engine limits ($P_{eng\_min}$, $P_{eng\_max}$). Then an equation for calculating the engine power estimate ($P_{eng\_pwr\_est}$) is selected based on the comparison.

In operation 144, the ECU 40 determines if the function $f(P_{eng\_pwr\_tot}, \tau_{eng}, T_{eng\_brk}, \omega_{eng})$ is less than the minimum engine power ($P_{eng\_min}$). If the determination at operation 144 is positive, then the ECU 40 limits the engine power estimate to the minimum engine power ($P_{eng\_pwr\_est}=P_{eng\_min}$) at operation 146. If the determination at operation 144 is negative, then the ECU 40 proceeds to operation 148. In operation 148, the ECU 40 determines if the function $f(P_{eng\_pwr\_tot}, \tau_{eng}, T_{eng\_brk}, \omega_{eng})$ is greater than the maximum engine power ($P_{eng\_max}$). If the determination at operation 148 is positive, then the ECU 40 limits the engine power estimate to the maximum engine power ($P_{eng\_pwr\_est}=P_{eng\_max}$) at operation 150.

If the determination at operation 148 is negative, then the ECU 40 proceeds to operation 152. In operation 152, the ECU 40 calculates the engine power estimate ($P_{eng\_pwr\_est}$) according to equation 7 as shown below:

$$P_{eng\_pwr\_est}=f(P_{eng\_pwr\_tot}, \tau_{eng}, T_{eng\_brk}, \omega_{eng}) \quad \text{Eq. 7}$$

The ECU 40 proceeds to block 154, once it has calculated the engine power estimate ($P_{eng\_pwr\_est}$) in block 142. In block 154 the ECU 40 determines the driver power estimate ($P_{drv}$) based on the filtered driver torque request ($T_{req}$). First the driver torque request ($T_{req\_unf}$) is filtered by the weighted average filter 78 (as shown in FIG. 3). The sum of the filtered driver torque request ($T_{req}$) and the transmission mechanical losses ($T_{trans\_loss}$) is compared to the system limits ($T_{sys\_min}$, $T_{sys\_max}$). Then an equation for calculating the driver power estimate ($P_{eng\_pwr\_est}$) is selected based on the comparison.

In operation 156, the ECU 40 determines if the sum of the filtered driver torque request ($T_{req}$) and the transmission mechanical losses ($T_{trans\_loss}$) is less than the minimum system torque ($T_{sys\_min}$). If the determination at operation 156 is positive, then the ECU 40 limits the torque to the minimum system torque and calculates the driver power estimate ($P_{drv}$) at operation 158 according to equation 8 as shown below:

$$P_{drv}=(T_{sys\_min}*\omega_{oss})+P_{sys\_loss} \quad \text{Eq. 8}$$

If the determination at operation 156 is negative, then the ECU 40 proceeds to operation 160. In operation 160, the ECU 40 determines if the sum of the filtered driver torque request ($T_{req}$) and the transmission mechanical losses ($T_{trans\_loss}$) is greater than the maximum system torque ($T_{sys\_max}$). If the determination at operation 160 is positive, then the ECU 40 limits the torque to the maximum system torque and calculates the driver power estimate ($P_{drv}$) at operation 162 according to equation 9 as shown below:

$$P_{drv}=(T_{sys\_max}*\omega_{oss})+P_{sys\_loss} \quad \text{Eq. 9}$$

If the determination at operation 160 is negative, then the ECU 40 proceeds to operation 164. In operation 164, the ECU 40 calculates the driver power estimate ($P_{drv}$) according to equation 10 as shown below:

$$P_{drv} = ((T_{req} + T_{trans\_loss}) * \omega_{oss}) + P_{sys\_loss} \qquad \text{Eq. 10}$$

The control system proceeds to block 166, once it has determined the driver power estimate in block 154. In block 166 the ECU 40 determines the feedback high voltage battery power modification value ($P_{bat\_pwr\_mod}$). The difference between the driver power request ($P_{drv\_unf}$) and the engine power estimate ($P_{eng\_pwr\_est}$) is compared to the battery limits ($P_{elec\_chg\_lim}$, $P_{elec\_dch\_lim}$). An equation for calculating the feedback high voltage battery power request ($P_{bat\_reqpwrfb}$) is selected based on the comparison. Then the ECU 40 utilizes the PI controller 84 (as shown in FIG. 4) to calculate the feedback high voltage battery power modification value ($P_{bat\_pwrmod}$), based on the feedback high voltage battery power request ($P_{bat\_reqpwrfb}$).

In operation 168, the ECU 40 determines if the difference between the driver power estimate ($P_{drv\_unf}$) and the engine power estimate ($P_{eng\_pwr\_est}$) is less than the battery power charge limit ($P_{elec\_chg\_lim}$). If the determination at operation 168 is positive, then the ECU 40 limits the feedback high voltage battery power request to the battery power charge limit ($P_{bat\_reqpwrfb} = P_{elec\_chg\_lim}$) at operation 170. If the determination at operation 168 is negative, then the ECU 40 proceeds to operation 172. In operation 172, the ECU 40 determines if the difference between the driver power estimate ($P_{drv\_unf}$) and the engine power estimate ($P_{eng\_pwr\_est}$) is greater than the battery power discharge limit ($P_{elec\_dch\_lim}$). If the determination at operation 172 is positive, then the ECU 40 limits the feedback high voltage battery power request to the battery power discharge limit ($P_{bat\_reqpwrfb} = P_{elec\_dch\_lim}$) at operation 174.

If the determination at operation 172 is negative, then the ECU 40 proceeds to operation 176. In operation 176, the ECU 40 calculates the feedback high voltage battery power request ($P_{bat\_reqpwrfb}$) according to equation 11 as shown below:

$$P_{bat\_reqpwrfb} = P_{drv} - P_{eng\_pwr\_est} \qquad \text{Eq. 11}$$

The ECU 40 proceeds to operation 178, once it has determined the feedback high voltage battery power request in operation 170, 174 or 176. In operation 178 the ECU 40 utilizes the PI controller 84 (as shown in FIGS. 3 and 4) to calculate the feedback high voltage battery power modification value ($P_{bat\_pwr\_mod}$) according to equation 1 as shown above, and reproduced below:

$$P_{bat\_pwrmod} = (P_{bat\_reqpwrfb} - P_{bat\_act}) K_p + \int (P_{bat\_reqpwrfb} - P_{bat\_act}) K_i dt$$

The ECU 40 proceeds to block 180, once it has determined the feedback high voltage battery power modification value ($P_{bat\_pwrmod}$) in block 166. Additionally, if the determination at operation 141 is negative, that feedback is not enabled, then the ECU 40 proceeds to block 180, which bypasses the feedback loop (blocks 142, 154 and 166). In block 180 the ECU 40 determines the final high voltage battery power request ($P_{bat\_em\_des}$).

In block 180 the sum of the system limited feed forward high voltage battery power ($P_{bat\_pwr\_ff}$) and the feedback high voltage battery power modification value ($P_{bat\_pwr\_mod}$) is compared to the battery limits ($P_{elec\_chg\_lim}$, $P_{elec\_dch\_lim}$). An equation for calculating the final high voltage battery power request ($P_{bat\_em\_des}$) is selected based on the comparison.

In operation 182, the ECU 40 determines if the sum of the system limited feed forward high voltage battery power ($P_{bat\_pwr\_ff}$) and the feedback high voltage battery power modification value ($P_{bat\_pwr\_mod}$) is less than the battery power charge limit ($P_{elec\_chg\_lim}$). If the determination at operation 182 is positive, then the ECU 40 limits the final high voltage battery power request to the battery power charge limit ($P_{bat\_em\_des} = P_{elec\_chg\_lim}$) at operation 184. If the determination at operation 182 is negative, then the ECU 40 proceeds to operation 186. In operation 186, the ECU 40 determines if the sum of the system limited feed forward high voltage battery power ($P_{bat\_pwr\_ff}$) and the feedback high voltage battery power modification value ($P_{bat\_pwr\_mod}$) is greater than the battery power discharge limit ($P_{elec\_dch\_lim}$). If the determination at operation 186 is positive, then the ECU 40 limits the final high voltage battery power request to the battery power discharge limit ($P_{bat\_em\_des} = P_{elec\_dch\_lim}$) at operation 188.

If the determination at operation 186 is negative, then the ECU 40 proceeds to operation 190. In operation 190, the ECU 40 calculates the final high voltage battery power request ($P_{bat\_em\_des}$) according to equation 12 as shown below:

$$P_{bat\_em\_des} = P_{bat\_pwr\_ff} + P_{bat\_pwr\_mod} \qquad \text{Eq. 12}$$

As such, various embodiments provide one or more advantages. For example, the energy management control system simplifies the control logic of the vehicle. As described with respect to FIG. 2, this simplification includes separating speed and torque determinations into two independent control variables (GEAR_cmd, and $P_{bat\_em\_des}$). Further, the determination of the battery power request ($P_{bat\_em\_des}$) may be further simplified by disabling the feedback loop 71 (FIG. 3) under certain operating conditions, as described with respect to FIGS. 3-5C.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling energy distribution within a hybrid electric vehicle (HEV) powertrain including sensors in signal communication with a controller, the method comprising:
    generating, by the controller, a feedforward battery power value in response to input indicative of a driver torque request;
    generating, by the controller, a feedback battery power modification value in response to input indicative of actual battery power and the driver torque request;
    selectively disabling, by the controller, feedback by setting the feedback power modification value to zero; and
    calculating, by the controller, a battery power request based on a sum of the feedforward battery power value and the feedback battery power modification value.

2. The method of claim 1 further comprising:
    receiving, by the controller, a transmission torque loss indicative of mechanical efficiency losses; and
    calculating, by the controller, a torque command based on a system limited sum of the driver torque request and the transmission torque loss.

3. The method of claim 2 further comprising:
receiving, by the controller, a system power loss indicative of electrical efficiency losses; and
generating, by the controller, a driver power request based on the system power loss, the torque command, and input indicative of a transmission output shaft speed.

4. The method of claim 3 further comprising:
generating, by the controller, an engine power request based on a difference between the driver power request and a desired battery power request;
wherein generating the feedforward battery power value further comprises calculating the feedforward battery power value based on a difference between the driver power request and the engine power request.

5. The method of claim 1 further comprising:
generating, by the controller, an engine power estimate based on engine time delay, engine brake torque and engine speed;
filtering, by the controller, the driver torque request using a filter to generate a filtered driver torque request;
generating, by the controller, a driver power estimate based on a product of the filtered driver torque request and a transmission output shaft speed; and
wherein generating the feedback battery power modification value further comprises calculating the feedback battery power modification value based on a difference between the driver power estimate and the engine power estimate.

6. The method of claim 1 further comprising:
generating, by the controller, a wheel torque request in response to input indicative of a regenerative torque value and the driver torque request; and
comparing, by the controller, the wheel torque request to the battery power request to generate an engine torque command and a motor torque command.

7. A control system comprising:
sensors; and
a controller communicating with the sensors and configured to:
generate a driver power request based on a system limited sum of a driver torque request and a transmission torque loss value,
generate a feedforward battery power value based on the driver power request, and an engine power request,
generate a feedback battery power modification value based on a driver power estimate and an engine power estimate,
selectively disable feedback by setting the feedback power modification value to zero, and
generate a battery power request in response to the feedforward battery power value and the feedback battery power modification value.

8. The control system of claim 7 wherein the controller is further configured to generate a desired battery power request based on a motor speed, battery status and the driver power request.

9. The control system of claim 8 wherein the engine power request is based on a difference between the driver power request and the desired battery power request.

10. The control system of claim 7 wherein the controller is further configured to:
calculate the battery power request based on a sum of the feedforward battery power value and the feedback battery power modification value.

11. The control system of claim 10 wherein the controller is further configured to:
filter the driver torque request using a filter to generate a filtered driver torque request; and
generate the driver power estimate based on a product of the filtered driver torque request and a transmission output shaft speed.

12. The control system of claim 11 wherein the controller is further configured to generate the engine power estimate based on the engine power request and input indicative of engine time delay, engine brake torque, and engine speed.

13. A hybrid electric vehicle comprising:
a control unit configured to generate output indicative of a gear selection in response to a transmission input speed; and
a controller communicating with the control unit and configured to generate output indicative of an engine torque command and a motor torque command in response to input indicative of a driver torque request and actual battery power, and independent of the gear selection.

14. The hybrid electric vehicle of claim 13 further comprising:
a motor having a motor output shaft extending therefrom, the motor communicating with the controller and providing motor torque in response to the motor torque command; and
a transmission having a transmission input shaft adapted to selectively engage the motor output shaft for receiving the motor torque, the transmission being coupled to at least two drive wheels for transferring the motor torque to the drive wheels for propelling the hybrid electric vehicle.

15. The hybrid electric vehicle of claim 14 further comprising:
an engine having an engine output shaft extending therefrom, the engine communicating with the controller and providing engine torque in response to the engine torque command;
wherein the motor further comprises an input shaft adapted to selectively engage the engine output shaft, and wherein the motor is configured to collectively provide the motor torque and the engine torque to the transmission.

16. The hybrid electric vehicle of claim 13 wherein the controller is further configured to:
generate a battery power request in response to the driver torque request and the actual battery power; and
generate the output indicative of the engine torque command and the motor torque command in response to the battery power request.

17. The hybrid electric vehicle of claim 16 wherein the controller is further configured to:
generate a feedforward battery power value in response to the driver torque request;
generate a feedback battery power modification value in response to the driver torque request and the actual battery power; and
calculate the battery power request based on a sum of the feedforward battery power value and the feedback battery power modification value.

18. The hybrid electric vehicle of claim 13 wherein the driver torque request is indicative of an accelerator pedal position, and wherein the actual battery power is indicative of a battery voltage measurement and a battery current measurement.

* * * * *